United States Patent [19]
Hamerski

[11] Patent Number: 6,162,534
[45] Date of Patent: *Dec. 19, 2000

[54] STRETCH RELEASE ADHESIVE ARTICLE WITH SECONDARY RELEASE MEMBER

[75] Inventor: Michael D. Hamerski, Baldwin Township, Wis.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/143,824

[22] Filed: Aug. 31, 1998

[51] Int. Cl.⁷ .................................. C09J 7/02; B32B 7/12
[52] U.S. Cl. ................. 428/354; 248/205.3; 248/467; 248/683; 428/40.1; 427/208
[58] Field of Search ................. 428/40.1, 41.9, 428/343, 354; 427/208; 248/205.3, 467, 683

[56] References Cited

U.S. PATENT DOCUMENTS

| | | | |
|---|---|---|---|
| 4,736,917 | 4/1988 | Thuresson | 248/205.3 |
| 4,962,907 | 10/1990 | Gary | 248/205.3 |
| 5,409,189 | 4/1995 | Lühmann . | |
| 5,507,464 | 4/1996 | Hamerski et al. . | |
| 5,516,581 | 5/1996 | Kreckel . | |

FOREIGN PATENT DOCUMENTS

WO 97/07172  2/1997  WIPO .

*Primary Examiner*—Daniel Zirker
*Attorney, Agent, or Firm*—David B. Patchett

[57] ABSTRACT

A stretch releasing adhesive article for removably adhesively bonding an object to a surface includes a stretch release adhesive strip and a secondary release member. The stretch release adhesive strip includes a first adhesive end portion having oppositely facing major surfaces arranged to adhesively bond with the object and the surface and includes a non-adhesive tab portion. The secondary release member includes oppositely facing adhesive major surfaces having temporary or repositionable adhesive which allows the adhesive article to be repositioned on the surface and object prior to adhesively bonding the stretch release adhesive strip to the surface and object. The adhesive strength of the secondary release member is sufficient to maintain the secondary release member in adhesive contact with the object and surface when the stretch release adhesive strip is stretched during the removal process. After the stretch release adhesive strip is removed from the object and surface, the secondary release member can be removed from the surface by gently peeling or twisting the secondary release member from the surface.

12 Claims, 5 Drawing Sheets

STRETCH RELEASE ADHESIVE ARTICLE WITH SECONDARY RELEASE MEMBER

FIELD OF THE INVENTION

The present invention relates generally to stretch releasing adhesive articles for removably adhesively bonding an object to a surface and, more particularly, to such an adhesive article that is repositionable and can be removed in a controlled predictable manner.

BACKGROUND OF THE INVENTION

Adhesive tape strips which can be cleanly removed from a surface by stretching the tape strip are known in the prior art. Such stretch releasing adhesive tape strips have been used in a wide variety of applications including removably mounting an object, such as a hook or hanger, on a support surface, such as a wall. Conventional techniques for mounting a hook on a wall include driving a fastener, such as a nail or screw, into the wall, therefore creating a hole or otherwise damaging the wall. Stretch release adhesives tapes, in contrast, allow an item to be mounted on and removed from a wall without damaging the wall. Stretch release adhesive tape strips offer the additional advantage of working on a wide variety of wall surfaces including sheet rock, tile, and concrete, which are not well suited for conventional mounting techniques Examples of stretch releasing adhesive tape strips are disclosed in U.S. Pat. No. 5,516,581 to Kreckel et al., U.S. Pat. No. 5,507,464 to Hamerski et al., U.S. Pat. No. 5,409,189 to Lühmann, and co-pending U.S. patent application Ser. No. 08/308,937 to Bries et al. While such adhesive tape strips generally function satisfactorily, removal of such double-sided adhesive tape strips can present certain difficulties. For example, in situations where a double-sided stretch release adhesive tape strip is used to adhere an object to a wall, the release of the adhesive tape strip from both the object and the wall at the same time may cause the adhesive tape strip to snap-back in the direction of the stretching in a manner similar to the snapping effect of a stretched rubber band. In addition, if the adhesive tape strip releases from the wall before releasing from the object, the object can be catapulted in the direction of the stretched adhesive tape strip, particularly if the object is not held in place during removal.

Co-pending U.S. patent application Ser. No. 08/940,555 entitled Removable Adhesive Tape With Controlled Sequential Release, which is assigned to the same assignee as the present intention, discloses an improvement to double-sided stretchable adhesive tape strips which minimizes the aforementioned problem of catapulting by controlling the timing of the debonding from both the object and the support surface whereby one adhesive surface releases before the other. More particularly, the adhesive tape strip includes a lower adhesion portion on one surface and a greater adhesion portion on the surface opposite the lower adhesion portion, whereby during removal, the greater adhesion portion remains more aggressively adhered to either the support surface or the object, and the lower adhesion portion completely releases from its associated surface. The lower adhesion portion may be, for example, a release strip which completely debonds from its adhered surface prior to the complete debonding of the other side.

Although sequentially controlling the release of the adhesive surfaces minimizes the problem of catapulting, it does not entirely eliminate this problem. For example, if the adhesive bond between the adhesive tape strip and the support surface is inadequate, the adhesive tape strip will not release from the object before releasing from the support surface, and catapulting may occur. Such an inadequate bond can result, for example, if the support surface is not clean, if the installer does not press the object against the support surface with enough force, or if the support surface does not have compatible properties. In addition, the object may suddenly drop when the stretch release adhesive strip becomes completely debonded from the object. This sudden and often unexpected dropping of the object has been found to be undesirable.

To prevent the object from catapulting or suddenly dropping at the end of the removal process, users often hold the object in place while they stretch the adhesive strip. When users hold the object in place, however, they have a tendency to press the object against the support surface. This can cause the stretched portion of the adhesive strip to get pinched between the object and the support surface. If the user continues to stretch the adhesive strip after it has been pinched, the adhesive strip can break. Once this occurs, the object and adhesive strip must be removed from the wall by either prying or violently twisting the object from the wall. This often causes damage to the wall surface and/or leaves adhesive residue on the wall. In addition, currently available stretch release adhesive strips form a strong bond that does not allow the adhesive strip to be repositioned once it has been adhered to an object or support surface.

Co-pending U.S. patent application Ser. No. 09/103,274 entitled Stretch Release Adhesive Article With Stabilizer, which is assigned to the same assignee as the present invention, discloses an adhesive article using a sequentially releasing adhesive strip that further reduces the likelihood of catapulting. The adhesive article includes a sequentially releasing stretch release adhesive strip, a base member, and a stabilizer arranged to limit the relative movement between the stretch release adhesive strip and the base member. Thus, the stabilizer increases the likelihood that the stretch release adhesive strip will debond from the object before debonding from the support surface, thereby reducing the likelihood of catapulting. Under certain circumstances, however, catapulting can still occur.

It is therefore desirable to provide an adhesive article which eliminates the problem of catapulting, can be repositioned after being applied to a support surface, and which prevents the object from dropping suddenly at the end of the removal process. It is also desirable to provide an adhesive article which eliminates the need for a sequentially releasing stretch release tape strip.

SUMMARY OF THE INVENTION

The present invention provides a stretch releasing adhesive article for removably mounting an object, such as a hook, on a support surface, such as a wall. The adhesive article includes a stretch releasing adhesive strip and at least one secondary release member. The stretch release adhesive strip includes an adhesive first end portion and a non-adhesive tab portion. The first adhesive end portion has first and second oppositely facing major surfaces arranged to adhesively bond with the object and the support surface. The secondary release member can be arranged along the stretch release adhesive strip first end portion opposite the tab portion, or along one or both side edges of the stretch release adhesive strip. The secondary release member also has oppositely facing adhesive major surfaces arranged to adhesively bond with the object and support surface. The secondary release member adhesive surface arranged to adhesively bond with the support surface preferably includes a temporary or repositionable adhesive which allows the adhesive article to be repositioned on the support surface prior to adhesively bonding the stretch release adhesive strip to the support surface. In addition, the adhesive strength between the secondary release member and the support surface is sufficient to maintain the secondary release member in adhesive contact with the support surface when the stretch release adhesive strip is stretched and the stretch release adhesive strip is debonded from the object and support surface. After the stretch release adhesive strip is removed, the secondary release member can be removed from the support surface without leaving adhesive residue or damaging the support surface by gently peeling or twisting the secondary release member from the support surface. In this manner, the secondary release member serves to prevent the object from catapulting at the end of the stretch removal sequence and further prevents the object from suddenly falling when the stretch release adhesive strip completely debonds from the object and the support surface.

The secondary release member also eliminates the need for the user to hold or press the object against the support surface during removal in order to prevent catapulting and the sudden dropping of the object. By eliminating the need to hold the object during the removal process, the secondary release member prevents the stretch release adhesive strip from being pinched between the support surface and object, and therefore eliminates the possibility of the stretch release adhesive strip breaking before it completely debonds from the support surface and object. The secondary release member also eliminates the need for a sequentially releasing stretch release adhesive strip.

The adhesive article can include protective release liners that cover the various adhesive surfaces before the adhesive article is applied to the object and support surface. In one embodiment, each adhesive surface of the stretch release adhesive strip and secondary release member includes a separate release liner, thereby allowing the temporary adhesive surfaces of the secondary release member to be exposed, applied, and repositioned on the respective surfaces of the object and support surface before permanently adhering the stretch release adhesive strip to the object and support surface. Alternatively, each side of the adhesive article can include a single release liner that extends over aligned adhesive surfaces of the stretch release adhesive strip and secondary release member. In addition, each release liner covering a stretch release adhesive strip adhesive surface can be folded back on itself in overlapping relation so that the stretch release adhesive strip liner can be removed from its respective surface while the secondary release member remains adhesively bonded in a fixed position on the support surface and object. Thus, once the adhesive article has been placed in the desired location, the stretch release adhesive strip release liners can be removed and the stretch release adhesive strip adhesively bonded to the object or the support surface without removing the stretch release adhesive strip from the stretch release adhesive strip or object.

In another embodiment, the stretch release adhesive strip can be separably connected with the secondary release member. Separably connecting the stretch release adhesive strip with the secondary release member is desirable when separate release liners are used for each adhesive surface and the release liners therefore do not serve to hold the stretch release adhesive strip and secondary release member together. Thus, the separable connection holds the stretch release adhesive strip and secondary release member together and in alignment during installation. The separable connection can be, for example, an adhesive bond formed using a temporary adhesive, or can be a perforation at the interface between the stretch release adhesive strip and secondary release member.

BRIEF DESCRIPTION OF THE DRAWING

The present invention will be further described with reference to the accompanying drawings, in which.

DETAILED DESCRIPTION

Figure 1:
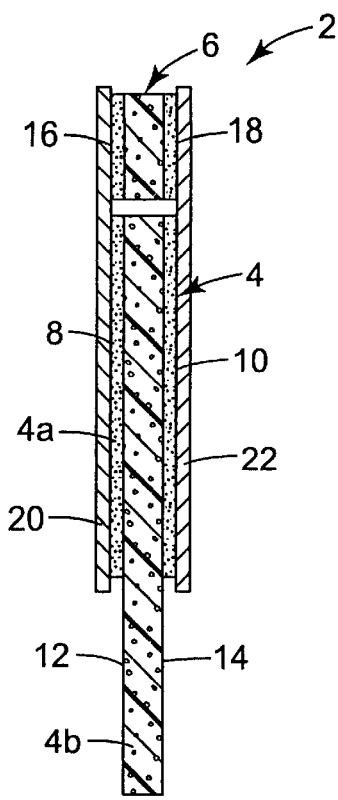
FIG. 1 is a cross-sectional side view of an adhesive article according to the present invention including continuous release liners extending along the entire length of each side of the article.

Referring now to the Figures, wherein like reference numeral are used to designate like features throughout, and first to FIG. 1, there is shown a stretch releasing adhesive article 2 including a stretch releasing adhesive strip 4 and a secondary release member 6. The stretch release adhesive strip 4 includes an adhesive first end portion 4a having adhesive oppositely facing first and second major surfaces 8,10, and a tab portion 4b having non-adhesive oppositely facing first and second major surfaces 12,14. Suitable stretch releasing adhesive strips are described in, for example, co-pending U.S. patent application Ser. No. 08/308,937 to Bries et al., U.S. Pat. No. 5,516,581 to Kreckel et al. U.S. Pat. No. 5,507,464 to Hamerski et al., U.S. Pat. No. 5,409,189 to Lühmann, and DE-OS 33 31 016.

The secondary release member 6 is arranged along the first end portion 4a of the stretch release adhesive strip opposite the tab portion 4b. The secondary release member 6 can be spaced from the stretch release adhesive strip 4 as shown, or it can be arranged adjacent the strip. The secondary release member 6 has first and second adhesive oppositely facing major surfaces 16, 18 that are generally aligned with the stretch release adhesive strip first and second major surfaces 8,10, respectively. To allow the adhesive article 2 to be repositioned on an object and support surface prior to adhesively bonding the stretch release adhesive strip 4 thereto, the secondary release member first and second major surfaces 16,18 are provided with a temporary, repositionable or readily removable adhesive, such as the Post-It Note brand adhesive available from the Minnesota Mining and Manufacturing Company, St. Paul, Minn. Alternatively, the secondary release member 6 can be adhesively bonded to the object using a stronger more permanent adhesive. The secondary release member 6 can be formed using conventional materials including paper, polymeric films, and polymeric foams which have been treated with a suitable repositionable adhesive. To facilitate manufacturing, the secondary release member 6 can be formed of the same material as the stretch release adhesive strip 4 which has been provided with a suitable repositionable adhesive.

In order to prevent catapulting during the removal process, the secondary release member 6 first and second adhesive surfaces 16,18 are provided with sufficient adhesive strength to remain in adhesive contact with an associated object and support surface during the stretching and consequent removal of the stretch release adhesive strip from the object and support surface. That is, the adhesive shear force between the secondary release member 6 and the support surface and between the secondary release member and the object must be greater than the shear force imparted on the secondary release member 6 by the stretch release adhesive strip 4 during the stretch removal process. In this way, the secondary release member 6 remains adhesively bonded to both the object and the support surface during the stretching and progressive interfacial debonding of the stretch release adhesive strip 4 from the object and support surface.

Upon complete removal of the stretch release adhesive strip, however, the temporary or repositionable adhesive, which can be provided on either or both secondary release member major surfaces 16,18, allows the secondary release member 6 to be manually peeled away from the object and support surface without leaving residue on or damaging the object or support surface.

Figure 2:
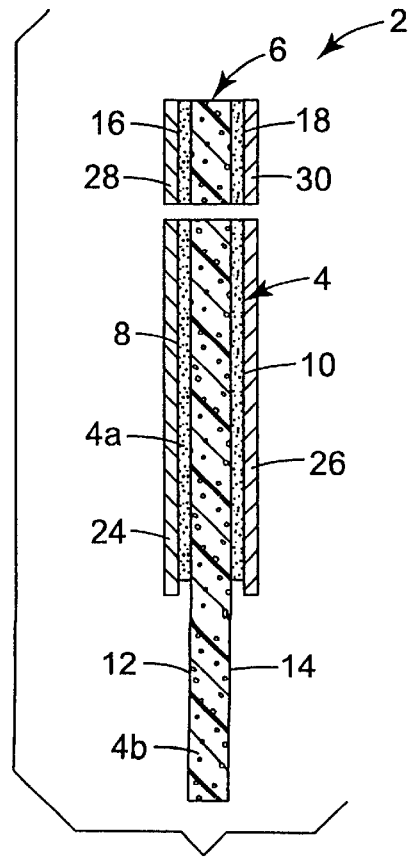
FIG. 2 is a cross-sectional side view of an adhesive article including individual release liners covering each adhesive surface of the stretch release adhesive strip and secondary release member.

Prior to use, protective release liners 20,22 are provided over the adhesive surfaces 8, 16 and 10, 18, respectively. The release liners 20, 22 can be, for example, a silicone release paper, non-adhesive polyester films, non-adhesive foams, or any conventional material which has been appropriately coated or treated with a suitable non-adhesive material so as to render it non-adhesive. Suitable non-adhesive coating materials include conventional powders and inks. As shown in FIG. 1, a single continuous release liner 20,22 can extend along the entire length of each side of the adhesive article 2, thereby covering both the stretch release adhesive strip adhesive surface 8,10 and the secondary release member adhesive surface 16,18. Alternatively, as shown in FIG. 2, separate release liners 24,26 and 28,30 can be provided for each adhesive surface, 8,10 and 16,18, respectively. Having separate release liners allows the temporary adhesive on one or both secondary release member adhesive surfaces 16,18 to be exposed and applied to either the object or support surface while the stretch release adhesive strip adhesive surfaces 8,10 remain covered. This allows the adhesive article to be readily removed from the surface or object and repositioned so that it can be placed in the desired location. Once properly positioned, the release liners 24,26 covering the stretch release adhesive strip adhesive surfaces 8,10, respectively, can be removed and the stretch release adhesive strip 4 can be adhesively bonded into place.

Figure 3:
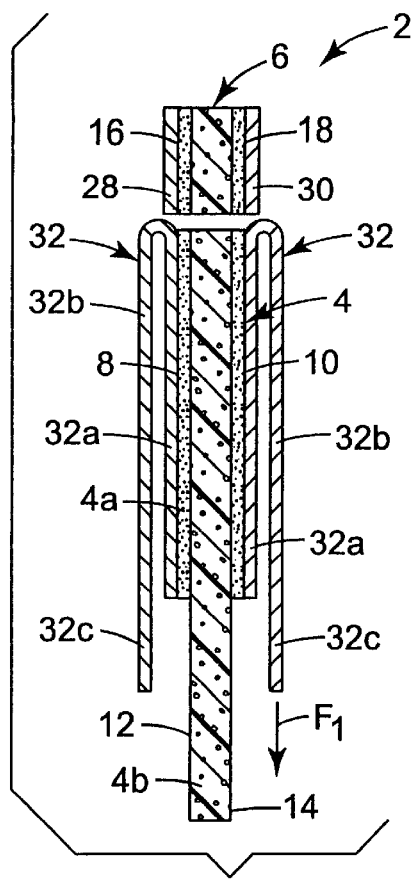
FIG. 3 is a cross-sectional side view of an adhesive article including an overlapping release liner that can be removed after the secondary release member has been adhesively bonded to an object or support surface.

It will be recognized that in order to remove the stretch release adhesive strip release liners 24,26 after the secondary release member 6 has been applied to the associated object or support surface, the adhesive article must be tilted away or temporarily removed from the object or support surface. Then, once the stretch release adhesive strip release liners 24,26 have been removed, the newly exposed adhesive surfaces can be bonded with the object and support surface. FIG. 3 shows a release liner 32 that can be removed when the secondary release member 6 is fully adhesively bonded to its respective surfaces, that is, without titling or temporarily removing the adhesive article from the associated surface as is required for the stretch release adhesive strip release liners of FIG. 2. Each release liner 32 shown in FIG. 3 includes a first portion 32a that extends along adhesive surface 8,10 and a second portion 32b that is folded back and arranged adjacent in overlapping relation with the first portion 32a. The release liner 32 also includes a terminal portion 32c that extends beyond the release liner first portion 32a and serves as a handle that can be manually grasped and pulled by a user, as indicated by arrow $F_1$, to separate the release liner from the adhesive surface 8,10.

Figure 4:
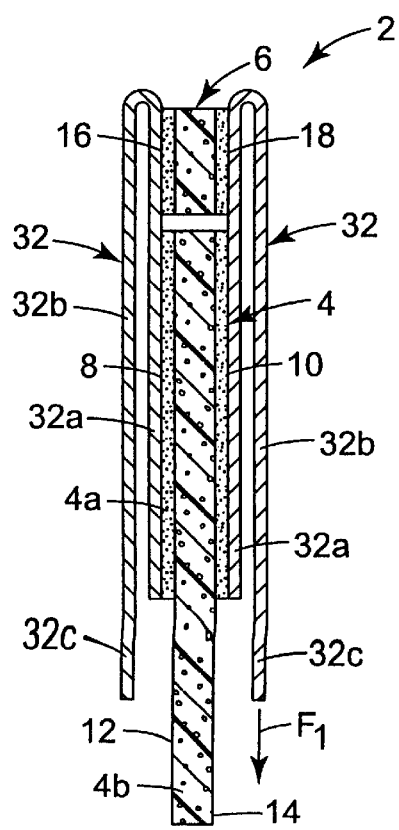
FIG. 4 is a cross-sectional side view of an adhesive article including continuous overlapping release liners extending along the entire length of each side of the article.

As shown in FIG. 4, a single continuous overlapping release liner 32 can be provided to extend along each side of the stretch release adhesive strip 4 and secondary release member 6, thereby eliminating the need for the separate release liners 28,30 provided for the secondary release member adhesive surfaces 16,18, respectively, in FIG. 3. Accordingly, each release liner 32 includes a first portion 32a that extends along a stretch release adhesive strip adhesive surface 8,10, and further extends along an aligned stretch release member adhesive surface 16,18, respectively. To apply the article 2 to a support surface or object, the release liner 32 is peeled back by applying a force $F_1$ to the terminal portion 32c of the release liner to expose the associated stretch release member adhesive surface 16,18. Once the article has been positioned as desired, the remainder of the release liner is peeled back to expose the associated stretch release strip adhesive surface 8,10, whereby the article 2 can be securely affixed to the support surface or object.

Figure 5:
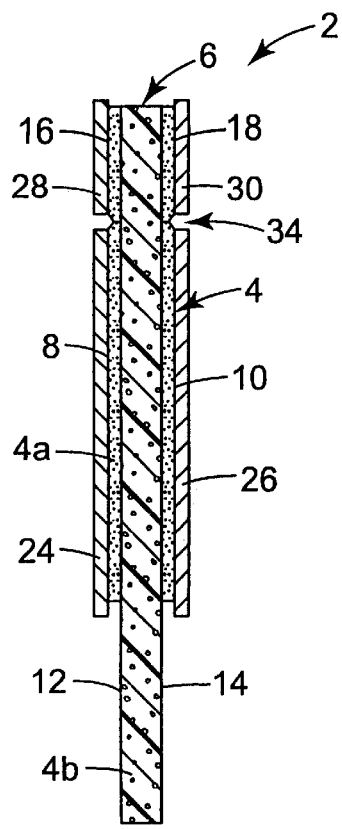
FIG. 5 is a cross-sectional side view of an alternate embodiment of the invention in which the stretch release adhesive strip is separably connected with the secondary release member.

FIG. 5 shows an alternate embodiment of the invention in which the stretch release adhesive strip 4 is separably connected with the secondary release member 6 at an interface designated by reference numeral 34. The separable connection can be a perforation or any other conventional frangible connection provided at the stretch release adhesive strip 4—secondary release member 6 interface 34. Alternatively, the stretch release adhesive strip 4 and secondary release member 6 can be adhesively bonded directly together using a low strength adhesive, or a separable intermediate material can be provided between the stretch release adhesive strip 4 and secondary release member 6. Providing a separable connection between the stretch release adhesive strip 4 and secondary release member 6 is desirable if two individual release liners are used to cover the aligned stretch release adhesive strip and secondary release member adhesive surfaces 8,10 and 16,18, respectively, as shown in FIGS. 2 and 3. When two individual release liners are used and the stretch release adhesive strip 4 and secondary release member 6 are not joined, the adhesive article 2 is more difficult to install since the stretch release adhesive strip and secondary release member are not held together and therefore have to be applied separately. Thus, the separable connection facilitates the use of the adhesive article by holding the stretch release adhesive strip and secondary release member together, and maintaining them in fixed positions relative to each other.

Figure 6:
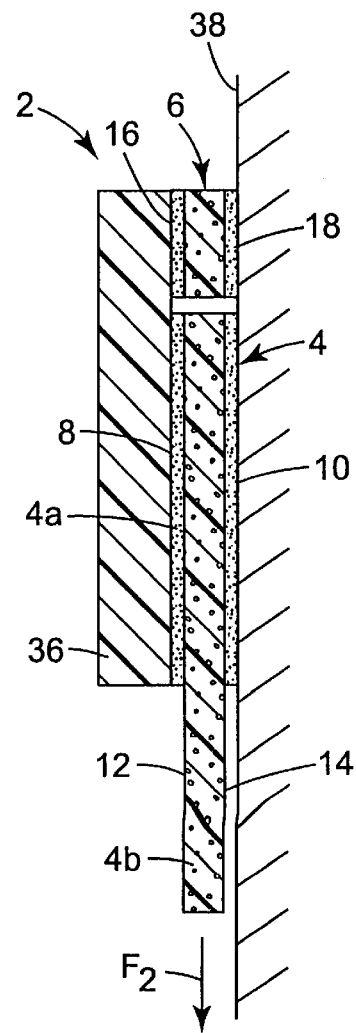
FIG. 6 is a cross-sectional side view of an adhesive article adhered to an object and a support surface.
Figure 7:
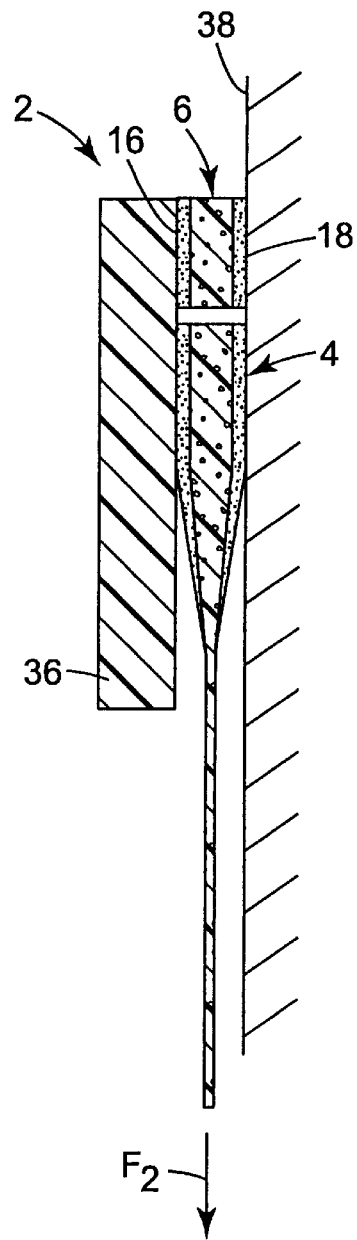
FIG. 7 is a cross-sectional side view of an adhesive article during the stretch removal process.
Figure 8:
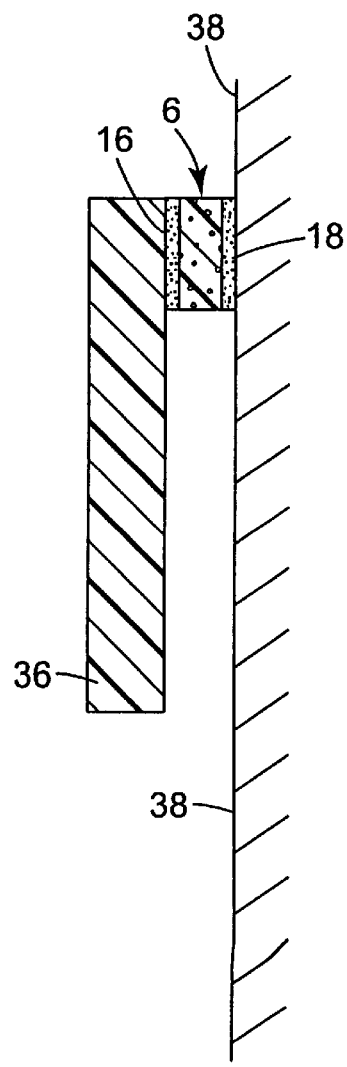
FIG. 8 is a cross-sectional side view of an adhesive article with the stretch release adhesive strip completely removed and the object adhesively bonded to the support surface with the secondary release member.

Application and removal of an adhesive article to an object 36 and support surface 38 is shown in FIGS. 6–8. To adhesively bond an object 36 to a support surface 38, the release liners covering the adhesive surfaces are removed to expose the underlying adhesive. If the adhesive article includes individual or split release liners as shown in FIGS. 2, 3, and 5, the release liners 28,30 on the secondary release member 6 are removed first to expose the temporary adhesive on surfaces 16,18, respectively, so that the adhesive article can be repositionably applied to the object 36 and support surface 38. Once properly positioned, the stretch release adhesive strip release liners 24,26 (FIGS. 2 and 5), or 32 (FIG. 3) are removed so that the stretch release adhesive strip 4 can be adhesively bonded to the object 36 and support surface 38.

Removal is accomplished by applying a force $F_2$ to the tab portion 4b of the stretch release adhesive strip 4. The force $F_2$ causes the stretch release adhesive strip 4 to stretch and progressively debond from the object 36 and support surface 38 as shown in FIG. 7. After the stretch release adhesive strip has completely debonded from the object 36 and support surface 38, the object remains adhesively bonded to the support surface by the secondary release member 6 as shown in FIG. 8. Thus, catapulting does not occur and the object does not unpredictably drop from the support surface at the end of the removal process. In addition, since the user does not have to hold the object 36 in place to prevent catapulting, the likelihood of pinching the stretched portion of the stretch release adhesive strip 4 between the object 36 and support surface 38 is reduced. Removal is completed by gently twisting or pealing the secondary release member 6 and the object 36 away from the support surface 38. If the adhesive surface 16 of the secondary release member that is bonded to the object 36 includes a temporary adhesive, the secondary release member 6 can be peeled from the object and the object 36 removed therefrom so that the object can be reused. In this manner, the present invention provides for the safe and predictable removal of the object from the support surface without using a sequential releasing stretch release adhesive strip, and without damaging the object or support surface.

Figure 9:
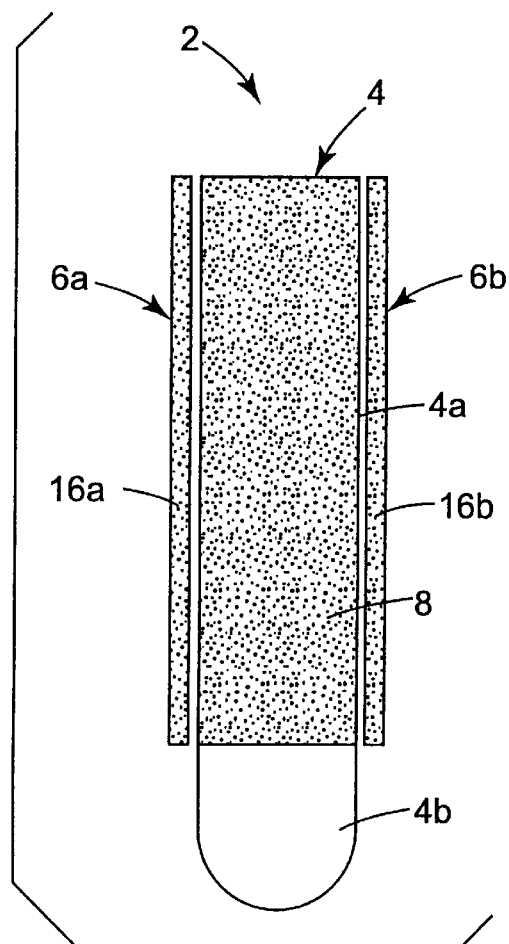
FIG. 9 is a plan view of an alternate embodiment of the invention.
Figure 10:
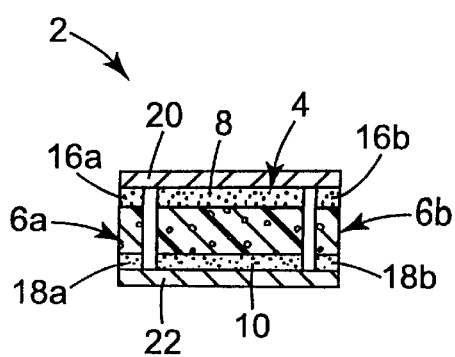
FIG. 10 is a cross-sectional end view of the adhesive article of FIG. 9 including release liners.
Figure 11:
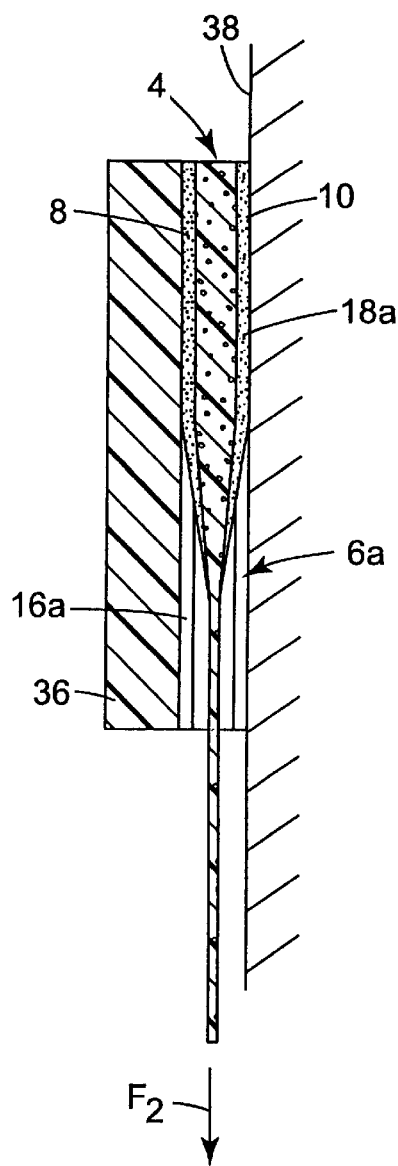
FIG. 11 is a cross-sectional side view of the adhesive article of FIG. 9 during the removal process.

FIGS. 9–11 show another embodiment of an adhesive article 2 which includes a stretch releasing adhesive strip 4 and secondary release members 6a,6b arranged along opposite sides of the stretch release adhesive strip 4. As shown in FIG. 11, one advantage of arranging the secondary release members in this manner is that they serve to prevent the object 36 from re-adhering with the stretched portion of the stretch release adhesive strip 4 during the removal process. Thus, the secondary release members prevent the stretched portion of the stretch release adhesive strip 4 from being pinched between the object 36 and support surface 38, and thereby eliminate the possibility of having the adhesive strip break prior to complete stretch removal.

The stretch release adhesive strip 4 is similar to the strip described previously and includes an adhesive first end portion 4a having adhesive oppositely facing first and second major surfaces 8,10, and further includes a non-adhesive tab portion 4b. Each secondary release member 6a,6b is an elongated strip extending along a respective side of the stretch release adhesive first end portion 4a. Of course, the secondary release member can have a length which is less than the length of the stretch release adhesive strip first end portion 4a, whereby the secondary release member would extend along a portion of the stretch release adhesive strip first end portion 4a. In addition, the secondary release members need not be provided on each side of the stretch release adhesive strip. That is, the adhesive article can include one secondary release member arranged on either side of the stretch release adhesive strip 4. The secondary release members 6a,6b can also be separably connected with the stretch release adhesive strip as described in reference to FIG. 5.

Each secondary release member 6a,6b includes first and second adhesive oppositely facing major surfaces 16a, 18a and 16b,18b, respectively, that are generally aligned with the stretch release adhesive strip first and second major surfaces 8,10, respectively. To allow the adhesive article 2 to be repositioned on the object 36 and support surface 38 prior to adhesively bonding the stretch release adhesive strip 4 thereto, the secondary release member first and second major surfaces 16a,18a and 16b,18b are provided with a temporary, repositionable or readily removable adhesive, such as the Post-It Note brand adhesive available from the Minnesota Mining and Manufacturing Company, St. Paul, Minn.

Prior to use, protective release liners 20,22 are provided over the adhesive surfaces of the stretch release adhesive strip and secondary release member. As shown in FIG. 10, a single release liner 20,22 can be provided to cover adjacent adhesive surfaces of the stretch release adhesive strip and secondary release member. Alternatively, separate release liners can be provided for each stretch release adhesive strip adhesive surface 8,10 and for each secondary release member adhesive surface 16a, 18a, 16b, 18b.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An adhesive article for adhesively bonding an object to a support surface comprising
    (a) a stretch releasing strip having first and second oppositely facing generally planar major surfaces for engagement with the object and support surface, respectively, said strip including a first end portion having adhesive first and second major surfaces, and a tab portion having non-adhesive first and second major surfaces, said adhesive first end portion adhesive first and second major surfaces undergoing progressive interfacial debonding from the object and support surface, respectively, when a predetermined force is applied to said tab portion, thereby separating said strip from the object and support surface; and
    (b) at least one secondary release member arranged adjacent said stretch releasing strip first end portion, said secondary release member having first and second oppositely facing adhesive surfaces for engagement with the object and support surface, respectively, wherein at least one of said secondary release member adhesive surfaces includes a repositionable adhesive.

2. An adhesive article as defined in claim 1, wherein said secondary release member is arranged along, said stretch releasing strip first end portion opposite said tab portion.

3. An adhesive article as defined in claim 1, wherein a first secondary release member extends along a first side of said stretch releasing strip first end portion and a second secondary release member is arranged along an opposite side of said stretch releasing strip first end portion.

4. An adhesive article as defined in claim 1, and further comprising a first release liner extending over said strip first adhesive surface and said secondary release member first adhesive surface, and a second release liner extending over said strip second adhesive surface and said secondary release member second adhesive surface.

5. An adhesive article as defined in claim 1, and further comprising a first release liner extending over said strip first adhesive surface and said secondary release member first adhesive surface, a second release liner extending over said strip second adhesive surface, and a third release liner extending over said secondary release member second adhesive surface.

6. An adhesive article as defined in claim 5, wherein said second release liner includes a first portion extending over said strip second adhesive surface and a handle portion folded back along said first portion and extending in overlapping relation with said tab portion.

7. An adhesive article as defined in claim 1, and further including a separable connection between said strip and said secondary release member.

8. An adhesive article as defined in claim 7, wherein said separable connection is a perforated interface.

9. An adhesive article as defined in claim 8, wherein said separable connection is an adhesive.

10. An adhesive article as defined in claim 1, and further including a separable connector arranged between said strip and said secondary release member.

11. An adhesive article for adhesively bonding an object to a support surface, comprising:
   (a) a stretch releasing strip having first and second oppositely facing generally planar major surfaces for engagement with the object and support surface, respectively, said strip including a first end portion having adhesive first and second major surfaces and further including a tab portion having non-adhesive first and second major surfaces, said adhesive first end portion first and second adhesive major surfaces undergoing progressive interfacial debonding from the object and support surface, respectively, when a predetermined force is applied to said tab portion, thereby separating said strip first end portion from the object and support surface; and
   (b) at least one secondary release member separably connected with said stretch releasing strip first end portion, said secondary release member having first and second oppositely facing adhesive surfaces for engagement with the object and support surface, respectively, said secondary release member first and second surfaces having sufficient adhesive strength to remain bonded to the object and support surface during stretching and removal of said stretch releasing strip from the object and support surface and separation from said secondary release member.

12. An adhesive article for adhesively bonding an object to a support surface comprising
   (a) a stretch releasing strip having first and second oppositely facing generally planar major surfaces for engagement with the object and support surface, respectively, said strip including a first end portion having adhesive first and second major surfaces, and a tab portion having non-adhesive first and second major surfaces, said adhesive first end portion adhesive first and second major surfaces undergoing progressive interfacial debonding from the object and support surface, respectively, when a predetermined force is applied to said tab portion, thereby separating said strip from the object and support surface;
   (b) at least one secondary release member arranged adjacent said stretch releasing strip first end portion, said secondary release member having first and second oppositely facing adhesive surfaces for engagement with the object and support surface, respectively, wherein at least one of said secondary release member adhesive surfaces includes a repositionable adhesive; and
   (c) a release liner extending over one of said stretch releasing strip first end portion adhesive first and second surfaces, said release liner including a first portion arranged adjacent and extending over said adhesive surface, and further including a handle portion folded back along said release liner first portion and extending in overlapping relation with said tab portion.

* * * * *

UNITED STATES PATENT AND TRADEMARK OFFICE
CERTIFICATE OF CORRECTION

PATENT NO. : 6,162,534
DATED : December 19, 2000
INVENTOR(S) : Michael D. Hamerski It is certified that error appears in the above-identified patent and that said Letters Patent is hereby corrected as shown below:

Title page,
Item [56] References Cited, insert -- 6,001,471  12/14/99  Bries et al. --.

Column 1,
Line 49, "intention" should read -- invention --.

Column 4,
Line 49, "numeral" should read -- numerals --.

Column 10,
Line 44, insert
-- 15. An adhesive article as defined in claim 1, wherein said secondary release member is arranged adjacent said stretch releasing strip.
16. An adhesive article as defined in claim 1, wherein said secondary release member is arranged in spaced relation to said stretch releasing strip. --.

Signed and Sealed this

Twenty-seventh Day of November, 2001

*Attest:*

NICHOLAS P. GODICI
*Attesting Officer*   *Acting Director of the United States Patent and Trademark Office*